(12) United States Patent
Ye et al.

(10) Patent No.: US 8,686,373 B2
(45) Date of Patent: Apr. 1, 2014

(54) INTERACTIVE DISPLAY DEVICE

(75) Inventors: Xinlin Ye, Beijing (CN); Zhenzhong Zou, Beijing (CN); Jianjun Liu, Beijing (CN); Xinbin Liu, Beijing (CN)

(73) Assignee: Beijing Irtouch Systems Co., Ltd, Beijing (CN)

( * ) Notice: Subject to any disclaimer, the term of this patent is extended or adjusted under 35 U.S.C. 154(b) by 214 days.

(21) Appl. No.: 13/381,619

(22) PCT Filed: Jul. 2, 2010

(86) PCT No.: PCT/CN2010/074924
§ 371 (c)(1),
(2), (4) Date: Feb. 14, 2012

(87) PCT Pub. No.: WO2011/000328
PCT Pub. Date: Jan. 6, 2011

(65) Prior Publication Data
US 2012/0133945 A1 May 31, 2012

(30) Foreign Application Priority Data

Jul. 3, 2009 (CN) .......................... 2009 1 0088313
Jul. 14, 2009 (CN) .......................... 2009 1 0157559

(51) Int. Cl.
*G01J 1/42* (2006.01)
(52) U.S. Cl.
USPC .......................................... 250/393; 345/175

(58) Field of Classification Search
USPC ......... 250/336.1, 338.1, 341.8, 393; 345/173, 345/175
See application file for complete search history.

(56) References Cited

U.S. PATENT DOCUMENTS

2009/0141002 A1* 6/2009 Sohn et al. .................... 345/175

FOREIGN PATENT DOCUMENTS

| CN | 101452358 | 6/2009 |
| CN | 201477557 | 5/2010 |
| CN | 201535901 | 7/2010 |
| WO | 2009/027773 | 3/2009 |

* cited by examiner

*Primary Examiner* — Mark R Gaworecki
(74) *Attorney, Agent, or Firm* — Harness, Dickey & Pierce, P.L.C.

(57) ABSTRACT

An interactive display device is disclosed. The interactive display device comprises: a housing, a user interface surface which is coupled with the housing, a display panel which is disposed under the user interface surface, an area light detector which is disposed under the display panel and configured to detect invisible light reflected by an object which is on or adjacent to the user interface surface, a plane light guide plate which is disposed under the area light detector, and an invisible light source which is disposed at the side of the plane light guide plate. The interactive display device has small size and better appearance, and thus is easy to be transported and more competitive.

13 Claims, 4 Drawing Sheets

INTERACTIVE DISPLAY DEVICE

TECHNICAL FIELD OF THE INVENTION

The present invention relates to display device technology, and more particularly to an interactive display device.

BACKGROUND OF THE INVENTION

The utility of a computer system could be enhanced by providing a better user interface. Since widespread application of personal computers (PC), the user interface of the computer system has been dramatically improved. Early PCs use input devices such as keyboard and mouse. However, significant improvements on microprocessors, available memory and programming functions have made contributions to improvement of user interface design and development of user-friendly graphic operating systems and hardware. A specific field of the improvement of the user interface technology relates to detection of an object approaching the user interfaces, also referred to as proximity detection. The proximity detection is the detection on the object including a physical object, user's hand or finger.

An existing interactive display device is provided with an infrared scanning light source and an infrared camera mounted at the bottom of its housing. The infrared scanning light source emits the infrared rays to periodically scan a user interface. When a finger of a user is approaching the user interface, it can reflect the infrared rays emitted by the infrared scanning light source, and the reflected infrared rays are received by the infrared camera. The position of the user's finger can be obtained through an analysis and processing of the computer system, and then corresponding response operation can be executed according to the position information. Since the infrared scanning light source needs a certain scanning radius during the scanning, the interactive display device is relatively high, causing that the interactive display device is of a large size and unfavorable for transport.

SUMMARY OF THE INVENTION

According to a first aspect of the present invention, an interactive display device is provided, which comprises: a housing, a user interface surface which is coupled with the housing, a display panel which is disposed under the user interface surface, an area light detector which is disposed under the display panel and configured to detect invisible light reflected by an object which is on or adjacent to the user interface surface, a plane light guide plate which is disposed under the area light detector, and an invisible light source which is disposed at the side of the plane light guide plate.

Further, the astigmatic plane of the plane light guide plate faces towards the user interface surface.

Further, the display panel is a liquid crystal display panel or a flat panel display panel.

Further, the invisible light source is a tubular infrared light source or an infrared point light source.

Further, the area light detector is a photosensitive layer.

Further, the photosensitive layer comprises phototransistor arrays.

Further, the user interface surface comprises a transparent adhesive layer, and refractive indexes of the transparent adhesive layer and the display panel are identical or close to each other.

Further, the transparent adhesive layer is an acrylic adhesive layer.

Further, the difference between the refractive indexes of the transparent adhesive layer and the display panel is not more than 10%.

Further, the user interface surface comprises an AG glass plate and a transparent adhesive layer disposed under the AG glass plate, and refractive indexes of the AG glass plate, the adhesive layer and the display panel are identical or close to one another.

Further, the difference among the refractive indexes of the AG glass plate, the adhesive layer and the display panel is not more than 10%.

According to a second aspect of the present invention, an interactive display device is provided, which comprises: a housing, a user interface surface which is coupled with the housing, a plane light guide plate which is disposed under the user interface surface, an invisible light source which is disposed at the side of the plane light guide plate, a display panel which is disposed under the plane light guide plate, and an area light detector which is disposed under the display panel and configured to detect invisible light reflected by an object which is on or adjacent to the user interface surface.

According to a third aspect of the present invention, an interactive display device is provided, which comprises: a housing, a user interface surface which is coupled with the housing, a display panel which is disposed under the user interface surface, a plane light guide plate which is disposed under the display panel, an invisible light source which is disposed at the side of the plane light guide plate, and an area light detector which is disposed under the plane light guide plate and configured to detect invisible light reflected by an object which is on or adjacent to the user interface surface.

According to a fourth aspect of the present invention, an interactive display device is provided, which comprises: a housing, a user interface surface which is coupled with the housing, a plane light guide plate which is disposed under the user interface surface, an invisible light source which is disposed at the side of the plane light guide plate, an area light detector which is disposed under the plane light guide plate and configured to detect invisible light reflected by an object which is on or adjacent to the user interface surface, and a display panel which is disposed under the area light detector.

According to a fifth aspect of the present invention, an interactive display device is provided, which comprises: a housing, a user interface surface which is coupled with the housing, a display panel which is disposed under the user interface surface, a plane light guide plate which is disposed under the display panel, an invisible light source which is disposed at the side of the plane light guide plate, and a light detector which is disposed at the bottom of the housing and configured to detect invisible light reflected by an object which is on or adjacent to the user interface surface.

Further, the invisible light source is a tubular infrared light source or an infrared point light source, and the light detector is an infrared camera.

According to a sixth aspect of the present invention, an interactive display device is provided, which comprises: a housing, a user interface surface which is coupled with the housing, a plane light guide plate which is disposed under the user interface surface, an invisible light source which is disposed at the side of the plane light guide plate, a display panel which is disposed under the plane light guide plate, and a light detector which is disposed at the bottom of the housing and configured to detect invisible light reflected by an object which is on or adjacent to the user interface surface.

According to a seventh aspect of the present invention, an interactive display device is provided, which comprises: a housing, a user interface surface which is coupled with the housing, an invisible light source for emitting invisible light, a plane light guide plate for reflecting and refracting the invisible light emitted by the invisible light source, a display panel, and an area light detector for detecting invisible light reflected by an object which is on or adjacent to the user interface surface.

Further, the display panel is disposed under the user interface surface, the area light detector is disposed under the display panel, the plane light guide plate is disposed under the area light detector, and the invisible light source is disposed at the side of the plane light guide plate.

Further, the plane light guide plate is disposed under the user interface surface, the invisible light source is disposed at the side of the plane light guide plate, the display panel is disposed under the plane light guide plate, and the area light detector is disposed under the display panel.

Further, the display panel is disposed under the user interface surface, the plane light guide plate is disposed under the display panel, the invisible light source is disposed at the side of the plane light guide plate, and the area light detector is disposed under the plane light guide plate.

Further, the plane light guide plate is disposed under the user interface surface, the invisible light source is disposed at the side of the plane light guide plate, the area light detector is disposed under the plane light guide plate, and the display panel is disposed under the area light detector.

According to an eighth aspect of the present invention, an interactive display device is provided, which comprises: a housing, a user interface surface which is coupled with the housing, an invisible light source for emitting invisible light, a plane light guide plate for reflecting and refracting the invisible light emitted by the invisible light source, a display panel, and a light detector for detecting invisible light reflected by an object which is on or adjacent to the user interface surface.

Further, the light detector is disposed at the bottom of the housing, the display panel is disposed under the user interface surface, the plane light guide plate is disposed under the display panel, and the invisible light source is disposed at the side of the plane light guide plate.

Further, the light detector is disposed at the bottom of the housing, the plane light guide plate is disposed under the user interface surface, the invisible light source is disposed at the side of the plane light guide plate, and the display panel is disposed under the plane light guide plate.

DETAILED DESCRIPTION OF THE PREFERRED EMBODIMENTS

The present invention will be described in detail in combination with the figures and specific embodiments.

In an embodiment of the present invention, the interface display device can comprise a housing, a user interface surface which is coupled with the housing, an invisible light source for emitting invisible light, a plane light guide plate for reflecting and refracting the invisible light emitted by the invisible light source, a display panel and an area light detector for detecting invisible light reflected by an object which is on or adjacent to the user interface surface. The plane light guide plate, the display panel and the area light detector are arranged in the housing in an order, and the invisible light source is disposed at the side of the plane light guide plate. In one embodiment, the display panel, the area light detector and the plane light guide plate are sequentially arranged under the user interface surface (which will be specifically described later with reference to FIG. 1). In another embodiment, the plane light guide plate, the display panel and the area light detector are sequentially arranged under the user interface surface (which will be specifically described later with reference to FIG. 3). In still another embodiment, the display panel, the plane light guide plate and the area light detector are sequentially arranged under the user interface surface (which will be specifically described later with reference to FIG. 4). In another embodiment, the plane light guide plate, the area light detector and the display panel are sequentially arranged under the user interface surface (which will be specifically described later with reference to FIG. 5).

In other embodiment of the present invention, the interface display device can comprise a housing, a user interface surface which is coupled with the housing, an invisible light source for emitting invisible light, a plane light guide plate for reflecting and refracting the invisible light emitted by the invisible light source, a display panel and a light detector for detecting the invisible light reflected by an object which is on or adjacent to the user interface surface. The plane light guide plate and the display panel are arranged in the housing in an order, the invisible light source is disposed at the side of the plane light guide plate, and the light detector is disposed at the bottom of the housing. In one embodiment, the display panel and the plane light guide plate are sequentially arranged under the user interface surface (which will be specifically described later with reference to FIG. 6). In another embodiment, the plane light guide plate and the display panel are sequentially arranged under the user interface surface (which will be specifically described later with reference to FIG. 8).

Figure 1:
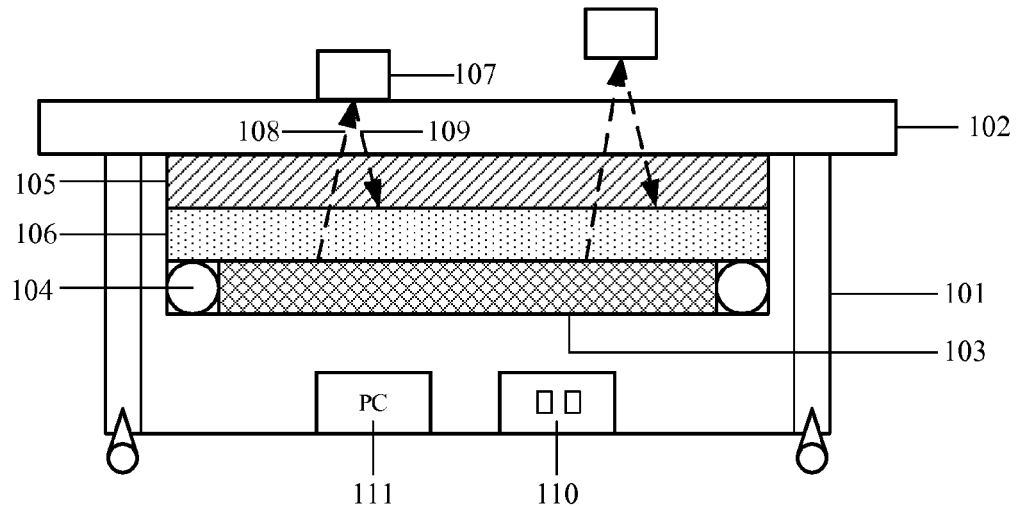
FIG. 1 is a schematic sectional view of the interactive display device according to a first embodiment of the present invention.

FIG. 1 is the schematic sectional view of the interactive display device according to the first embodiment of the present invention. As shown in FIG. 1, the interactive display device of this embodiment comprises the housing 101, the user interface surface 102 coupled with the housing 101, the display panel 105 disposed under the user interface surface 102, the area light detector 106 disposed under the display panel 105 and configured to detect the invisible light reflected by the object which is on or adjacent to the user interface surface 102, a plane light guide plate 103 disposed under the area light detector 106, and an invisible light source 104 disposed at the side of the plane light guide plate 103. The display panel 105, the area light detector 106, the plane light guide plate 103 and the invisible light source 104 are disposed within the housing 101. In addition, a power supply 110 and a computer system (PC) 111 are disposed inside the housing 101. In this embodiment, the user interface surface 102 can be virtual or actual. The invisible light source 104 can be a tubular infrared light source or an infrared point light source, in this way, the invisible light is infrared light. The display panel 105 can be a liquid crystal display (LCD) panel or a flat panel display (FPD) panel. The area light detector 106 is a photosensitive layer which may comprise phototransistor arrays. The lower surface of the photosensitive layer can transmit the infrared light and the upper surface thereof can receive the infrared light. The astigmatic plane (scattering plane) of the plane light guide plate 103 faces towards the user interface surface 102.

The infrared light emitted by the invisible light source 104, such as the infrared light source, is reflected and refracted by the plane light guide plate 103, and reaches the user interface surface 102. When touching or approaching the user interface surface 102, a touch object 107 can reflect the infrared rays 108, and the reflected infrared rays 109 reflected by the touch object 107 are received by the area light detector 106 such as the photosensitive layer. The light signals received by the photosensitive layer are provided to the PC system 111 connected to the photosensitive layer. The position of the touch object 107 can be obtained after analysis and processing, and the obtained position information of the touch object 107 is then transmitted to related devices.

The interactive display device of this embodiment replaces the infrared scanning light source in the existing interactive display devices with the plane light guide plate 103 and the invisible light source 104 disposed at the side of the plane light guide plate 103, thereby significantly reducing the internal space of the interactive display device, and thus the interactive display device has smaller size and better appearance, so it is easy to be transported and more competitive.

Figure 2:
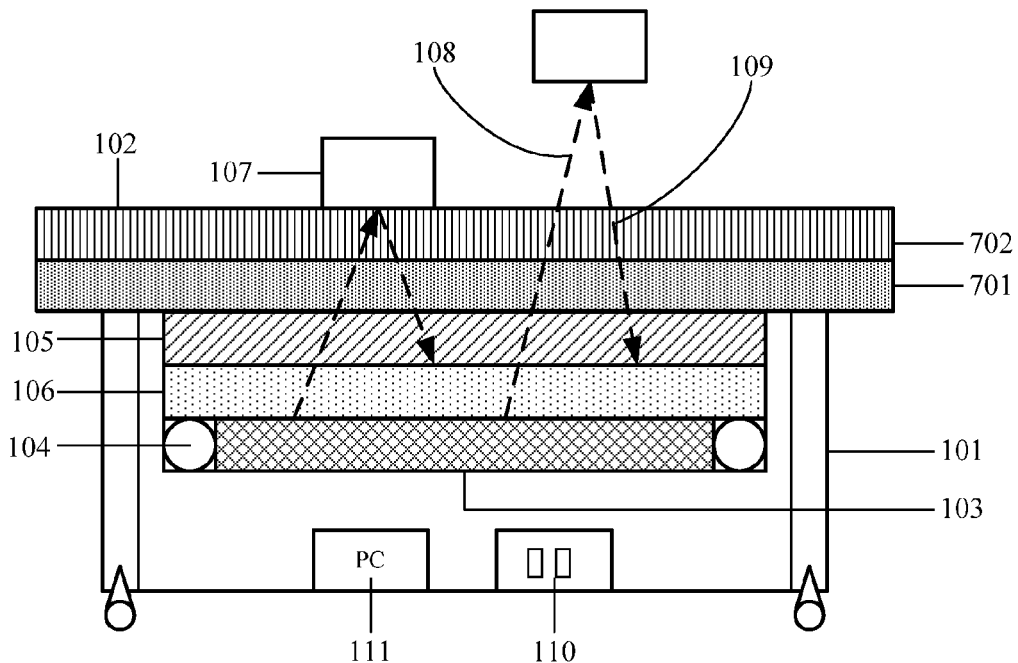
FIG. 2 is a schematic sectional view of a variant of the interactive display device according to the first embodiment of the present invention illustrated by FIG. 1.

FIG. 2 is the schematic sectional view of the variant of the interactive display device according to the first embodiment of the invention illustrated by FIG. 1. The variant optimizes the first embodiment of FIG. 1 in the structure. As shown in FIG. 2, the user interface surface 102 comprises the AG glass plate 702 and the transparent adhesive layer 701 disposed under the AG glass plate 702. Ideally, the transparent adhesive layer 701, the area light detector 106, the AG glass plate 702 and the display panel 105 have identical refractive index. But in fact, it is possible that the transparent adhesive layer 701, the area light detector 106, the AG glass plate 702 and the display panel 105 have the approximate refractive indexes. Preferably, the difference among their refractive indexes is not more than 10%. Furthermore, the user interface surface 102 can merely include the transparent adhesive layer 701. The transparent adhesive layer 701 can be an acrylic adhesive layer or other types of adhesive layer.

Figure 3:
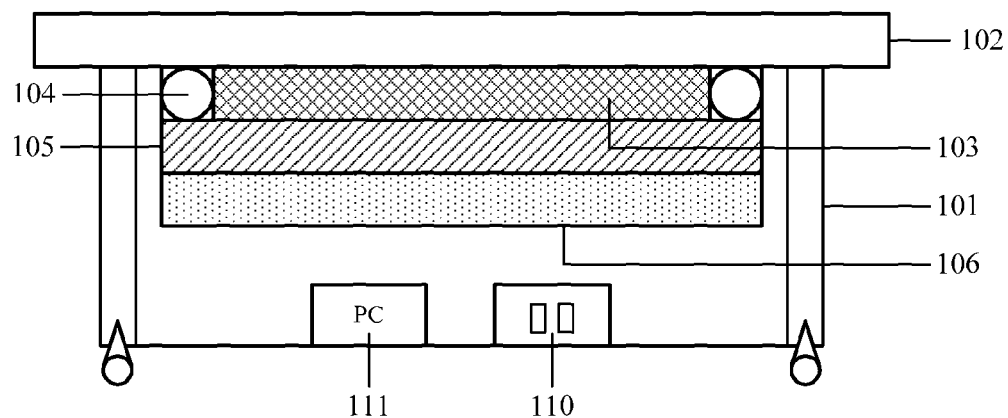
FIG. 3 is a schematic sectional view of the interactive display device according to a second embodiment of the present invention.

FIG. 3 is the schematic sectional view of the interactive display device according to the second embodiment of the present invention. As shown in FIG. 3, the interactive display device of this embodiment comprises the housing 101, the user interface surface 102 coupled with the housing 101, the plane light guide plate 103 disposed under the user interface surface 102, the invisible light source 104 disposed at the side of the plane light guide plate 103, the display panel 105 disposed under the plane light guide plate 103, and the area light detector 106 disposed under the display panel 105 and configured to detect the invisible light reflected by the object which is on or adjacent to the user interface surface 102. The plane light guide plate 103, the invisible light source 104, the display panel 105 and the area light detector 106 are disposed within the housing 101. In addition, the power supply 110 and the computer system (PC) 111 are placed inside the housing 101. The interactive display device of this embodiment differs from the interactive display device as shown in FIG. 1 in that the positions of the display panel 105, the plane light guide plate 103 and the area light detector 106 are different in the housing 101. The interactive display device of this embodiment is applicable to some special circumstances which have particular requirements to the installation structure.

Figure 4:
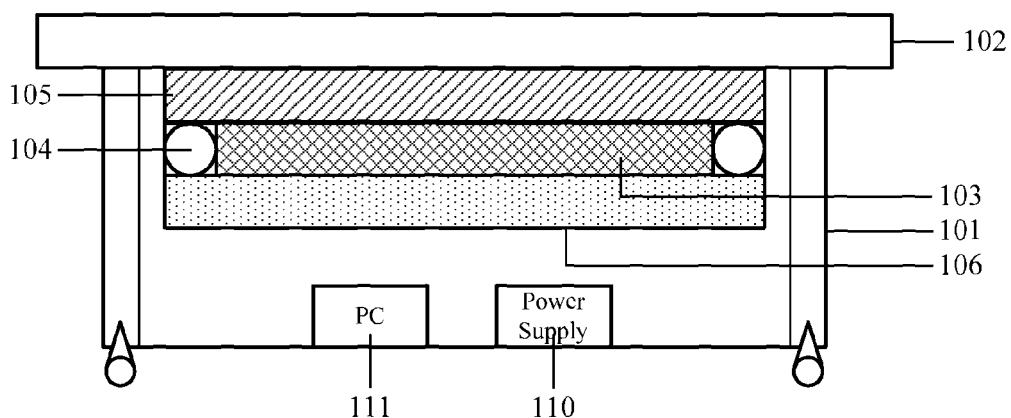
FIG. 4 is a schematic sectional view of the interactive display device according to a third embodiment of the present invention.

FIG. 4 is the schematic sectional view of the interactive display device according to the third embodiment of the present invention. As shown in FIG. 4, the interactive display device of this embodiment comprises the housing 101, the user interface surface 102 coupled with the housing 101, the display panel 105 disposed under the user interface surface 10, the plane light guide plate 103 disposed under the display panel 105, the invisible light source 104 disposed at the side of the plane light guide plate 103, and the area light detector 106 disposed under the plane light guide plate 103 and configured to detect the invisible light reflected by the object which is on or adjacent to the user interface surface 102. The display panel 105, the plane light guide plate 103, the invisible light source 104 and the area light detector 106 are disposed within the housing 101. In addition, the power supply 110 and the computer system (PC) 111 are placed inside the housing 101. The interactive display device of this embodiment differs from the interactive display devices as shown in FIGS. 1 and 2 in that the positions of the display panel 105, the plane light guide plate 103 and the area light detector 106 are different in the housing 101. The interactive display device of this embodiment is applicable to some special circumstances which have particular requirements to the installation structure.

Figure 5:
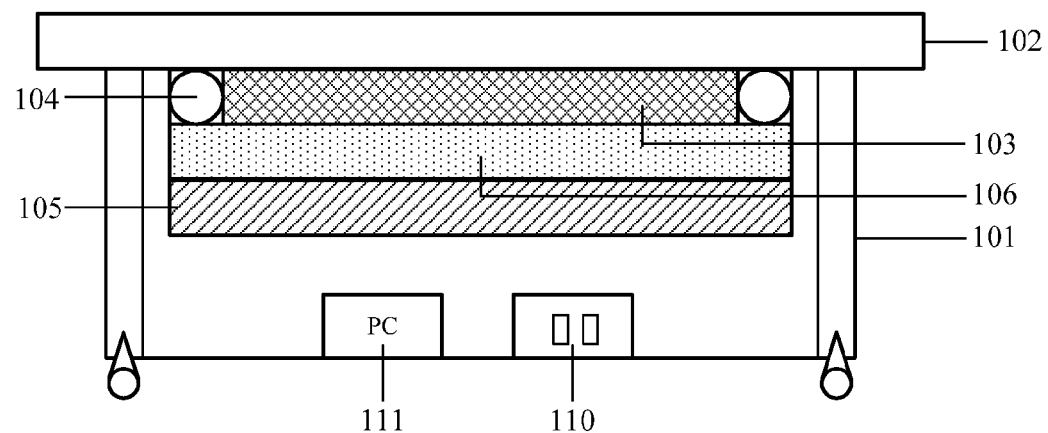
FIG. 5 is a schematic sectional view of the interactive display device according to a fourth embodiment of the present invention.

FIG. 5 is the schematic sectional view of the interactive display device according to the fourth embodiment of the present invention. As shown in FIG. 5, the interactive display device of this embodiment comprises the housing 101, the user interface surface 102 coupled with the housing 101, the plane light guide plate 103 disposed under the user interface surface 102, the invisible light source 104 disposed at the side of the plane light guide plate 103, the area light detector 106 disposed under the plane light guide plate 103 and configured to detect the invisible light reflected by the object which is on or adjacent to the user interface surface 102, and the display panel 105 disposed under the area light detector 106. The plane light guide plate 103, the invisible light source 104, the area light detector 106 and the display panel 105 are disposed within the housing 101. In addition, the power supply 110 and the computer system (PC) 111 are placed inside the housing 101. The interactive display device of this embodiment differs from the interactive display devices as shown in FIGS. 1, 2 and 3 in that the positions of the display panel 105, the plane light guide plate 103 and the area light detector 106 are different in the housing 101. The interactive display device of this embodiment is applicable to some special circumstances which have particular requirements to the installation structure.

Figure 6:
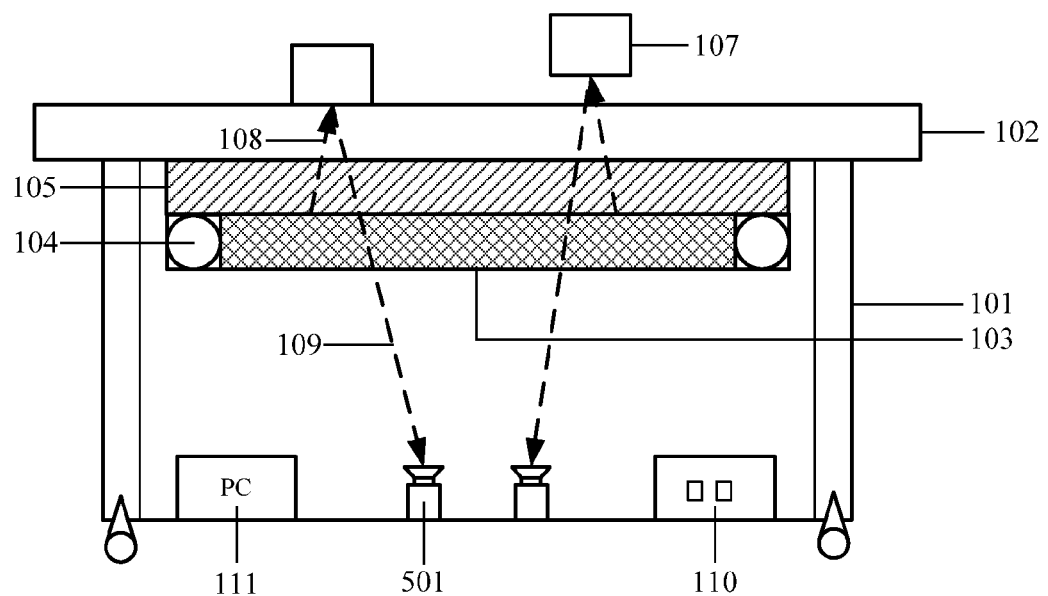
FIG. 6 is a schematic cross section diagram of an interactive display device according to the fifth embodiment of the present invention.

FIG. 6 is the schematic sectional view of the interactive display device according to the fifth embodiment of the present invention. As shown in FIG. 6, the interactive display device of this embodiment comprises the housing 101, the user interface surface 102 coupled with the housing 101, the display panel 105 disposed under the user interface surface 102, the plane light guide plate 103 disposed under the display panel 105, the invisible light source 104 disposed at the side of the plane light guide plate 103, and the light detector 501 disposed at the bottom of the housing 101 and configured to detect the invisible light reflected by the object which is on or adjacent to the user interface surface 102. The display panel 105, the plane light guide plate 103 and the invisible light source 104 are disposed within the housing 101. In addition, the power supply 110 and the computer system (PC) 111 are placed inside the housing 101. In this embodiment, the user interface surface 102 can be virtual or actual. The invisible light source 104 can be a tubular infrared light source or an infrared point light source, in this way, the invisible light is infrared light. The display panel 105 can be a LCD panel or a FPD panel. The light detector 501 can be one or more infrared cameras. In the embodiment as illustrated in FIG. 6, there are two infrared cameras. The astigmatic plane (scattering plane) of the plane light guide plate 103 faces towards the user interface surface 102.

The infrared light emitted by the invisible light source 104, such as infrared light source, is reflected and refracted by the plane light guide plate 103, and reaches the user interface surface 102. When touching or approaching the user interface surface 102, the touch object 107 can reflect the infrared rays 108. The reflected infrared rays 109 reflected by the touch object 107 are received by the infrared cameras 501 mounted at the bottom of the housing 101. The received infrared rays are provided to the PC system 111 connected to the infrared cameras 501. The position of the touch object 107 can be obtained after analysis and processing, and the obtained position information of the touch object 107 is then transmitted to related devices.

Compared with the interactive display devices as illustrated in FIGS. 1-4, the interactive display device of this embodiment has higher detection accuracy although the thickness thereof increases.

Figure 7:
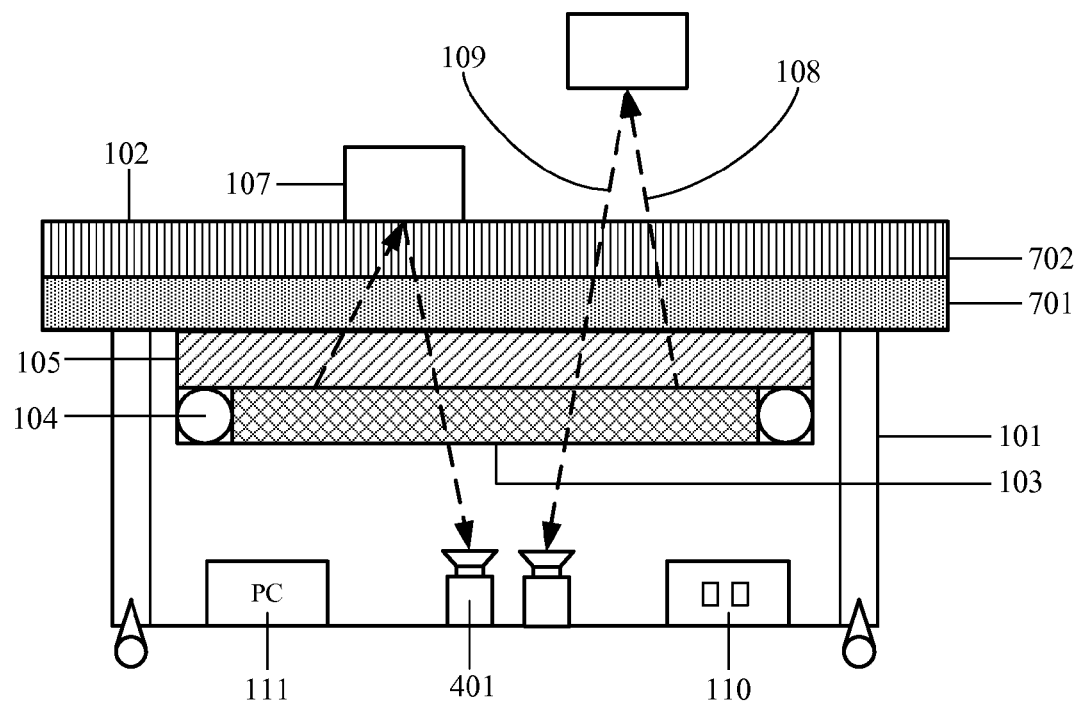
FIG. 7 is schematic sectional view of a variant of the interactive display device according to the fifth embodiment of the present invention illustrated by FIG. 6.

FIG. 7 is the schematic sectional view of the variant of the interactive display device according to the fifth embodiment of the present invention illustrated by FIG. 6. This variant optimizes the embodiment of FIG. 6 in the structure. As shown in FIG. 7, the user interface surface 102 comprises the AG glass plate 702 and the transparent adhesive layer 701 disposed under the AG glass plate 702. Ideally, the refractive indexes of the transparent adhesive layer 701, the AG glass plate 702 and the display panel 105 are identical. But in fact, it is possible that the refractive indexes of the transparent adhesive layer 701, the AG glass plate 702 and the display panel 105 are close to one another. Preferably, the difference among their refractive indexes is not more than 10%. Furthermore, the user interface surface 102 may merely include the transparent adhesive layer 701. The transparent adhesive layer 701 can be an acrylic adhesive layer or other types of adhesive layer.

Figure 8:
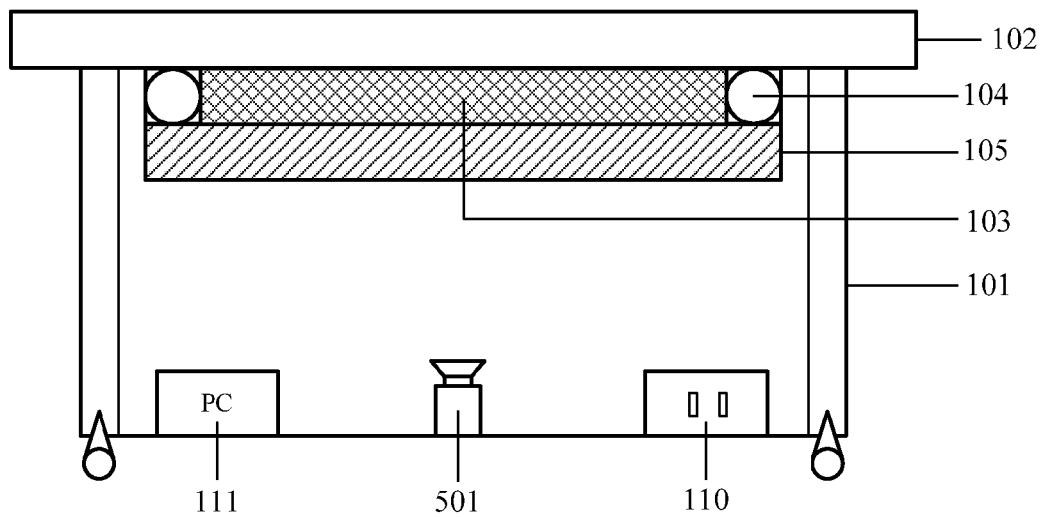
FIG. 8 is a schematic sectional view of the interactive display device according to a sixth embodiment of the present invention.

FIG. 8 is the schematic sectional view of the interactive display device according to the sixth embodiment of the present invention. As shown in FIG. 8, the interactive display device of this embodiment comprises the housing 101, the user interface surface 102 coupled with the housing 101, the plane light guide plate 103 disposed under the user interface surface 102, the invisible light source 104 disposed at the side of the plane light guide plate 103, the display panel 105 disposed under the plane light guide plate 103, and the light detector 501 disposed at the bottom of the housing 101 and configured to detect the invisible light reflected by the object which is on or adjacent to the user interface surface 102. The plane light guide plate 103, the invisible light source 104 and the display panel 105 are disposed within the housing 101. In this embodiment, the light detector 501 comprises an infrared camera. The interactive display device of this embodiment differs from the interactive display device as illustrated in FIG. 6 in that the positions of the display panel 105 and the plane light guide plate 103 are different in the housing 101.

It can be seen from the above description that the interactive display devices of the above embodiments replace the infrared scanning light source in the existing interactive display devices with the plane light guide plate and the invisible light source disposed at the side of the plane light guide plate, thereby significantly reducing the internal space of the interactive display device, and thus the interactive display device has smaller size and better appearance, so it is easy to be transported and more competitive.

Although the interactive display device of the present invention is described in detail hereinabove through the illustrative embodiments, these embodiments are not exhaustive, and it is appreciated that those skilled in the art can make all kinds of variations and modifications within the spirit and extent of the invention. Therefore, the present invention is not limited to these embodiments, and the scope of the present invention is merely defined by the appended claims.

The invention claim is:

1. An interactive display device comprising:
   a housing;
   a user interface surface which couples with the housing;
   a display panel which is disposed under the user interface surface;
   an area light detector which is disposed under the display panel and configured to detect invisible light reflected by an object which is on or adjacent to the user interface surface;
   a plane light guide plate which is disposed under the area light detector, the astigmatic face of the plane light guide faces towards the user interface surface; and
   an invisible light source which is disposed at the side of the plane light guide plate.

2. An interactive display device comprising:
   a housing;
   a user interface surface which is coupled with the housing;
   a plane light guide plate which is disposed under the user interface surface, the astigmatic face of the plane light guide plate faces towards the user interface surface;
   an invisible light source which is disposed at the side of the plane light guide plate;
   a display panel which is disposed under the plane light guide plate; and
   an area light detector which is disposed under the display panel and configured to detect invisible light reflected by an object which is on or adjacent to the user interface surface.

3. An interactive display device comprising:
   a housing;
   a user interface surface which is coupled with the housing;
   a display panel which is disposed under the user interface surface;
   a plane light guide plate which is disposed under the display panel, the astigmatic face of the plane light guide plate faces towards the user interface surface;
   an invisible light source which is disposed at the side of the plane light guide plate; and
   an area light detector which is disposed under the plane light guide plate and configured to detect invisible light reflected by an object which is on or adjacent to the user interface surface.

4. An interactive display device comprising:
   a housing;
   a user interface surface which is coupled with the housing;

a plane light guide plate which is disposed under the user interface surface, the astigmatic face of the plane light guide plate faces towards the user interface surface;

an invisible light source which is disposed at the side of the plane light guide plate;

an area light detector which is disposed under the plane light guide plate and configured to detect invisible light reflected by an object which is on or adjacent to the user interface surface; and a display panel which is disposed under the area light detector.

5. The interactive display device according to any one of claims 1-4, wherein the invisible light source is a tubular infrared light source or an infrared point light source.

6. The interactive display device according to claim 5, wherein the area light detector is a photosensitive layer, and the photosensitive layer comprises phototransistor arrays.

7. The interactive display device according to claim 6, wherein the user interface surface comprises a transparent adhesive layer, and the difference between the refractive indexes of the transparent adhesive layer and the display panel is not more than 10%.

8. The interactive display device according to claim 6, wherein the user interface surface comprises an AG glass plate and a transparent adhesive layer disposed under the AG glass plate, and the difference among the refractive indexes of the AG glass plate, the adhesive layer and the display panel is not more than 10%.

9. An interactive display device comprising:
a housing;
a user interface surface which is coupled with the housing;
a display panel which is disposed under the user interface surface;
a plane light guide plate which is disposed under the display panel, the astigmatic face of the plane light guide plate faces towards the user interface surface;
an invisible light source which is disposed at the side of the plane light guide plate; and
a light detector which is disposed at the bottom of the housing and configured to detect invisible light reflected by an object which is on or adjacent to the user interface surface.

10. An interactive display device comprising:
a housing;
a user interface surface which is coupled with the housing;
a plane light guide plate which is disposed under the user interface surface, the astigmatic face of the plane light guide plate faces towards the user interface surface;
an invisible light source which is disposed at the side of the plane light guide plate;
a display panel which is disposed under the plane light guide plate; and
a light detector which is disposed at the bottom of the housing and configured to detect invisible light reflected by an object which is on or adjacent to the user interface surface.

11. The interactive display device according to claims 9 or 10, wherein the invisible light source is a tubular infrared light source or an infrared point light source, and the light detector is an infrared camera.

12. The interactive display device according to claim 11, wherein the user interface surface comprises a transparent adhesive layer, and the difference between the refractive indexes of the transparent adhesive layer and the display panel is not more than 10%.

13. The interactive display device according to claim 11, wherein the user interface surface comprises an AG glass plate and a transparent adhesive layer disposed under the AG glass plate, and the difference among the refractive indexes of the AG glass plate, the adhesive layer and the display panel is not more than 10%.

* * * * *